Jan 6, 1931.  L. K. ANSELL  1,787,608
ANTISKIDDING DEVICE FOR MOTOR VEHICLES
Filed Oct. 9, 1929  3 Sheets-Sheet 1

INVENTOR
L. K. ANSELL
BY J. H. G. Cook
ATTORNEY

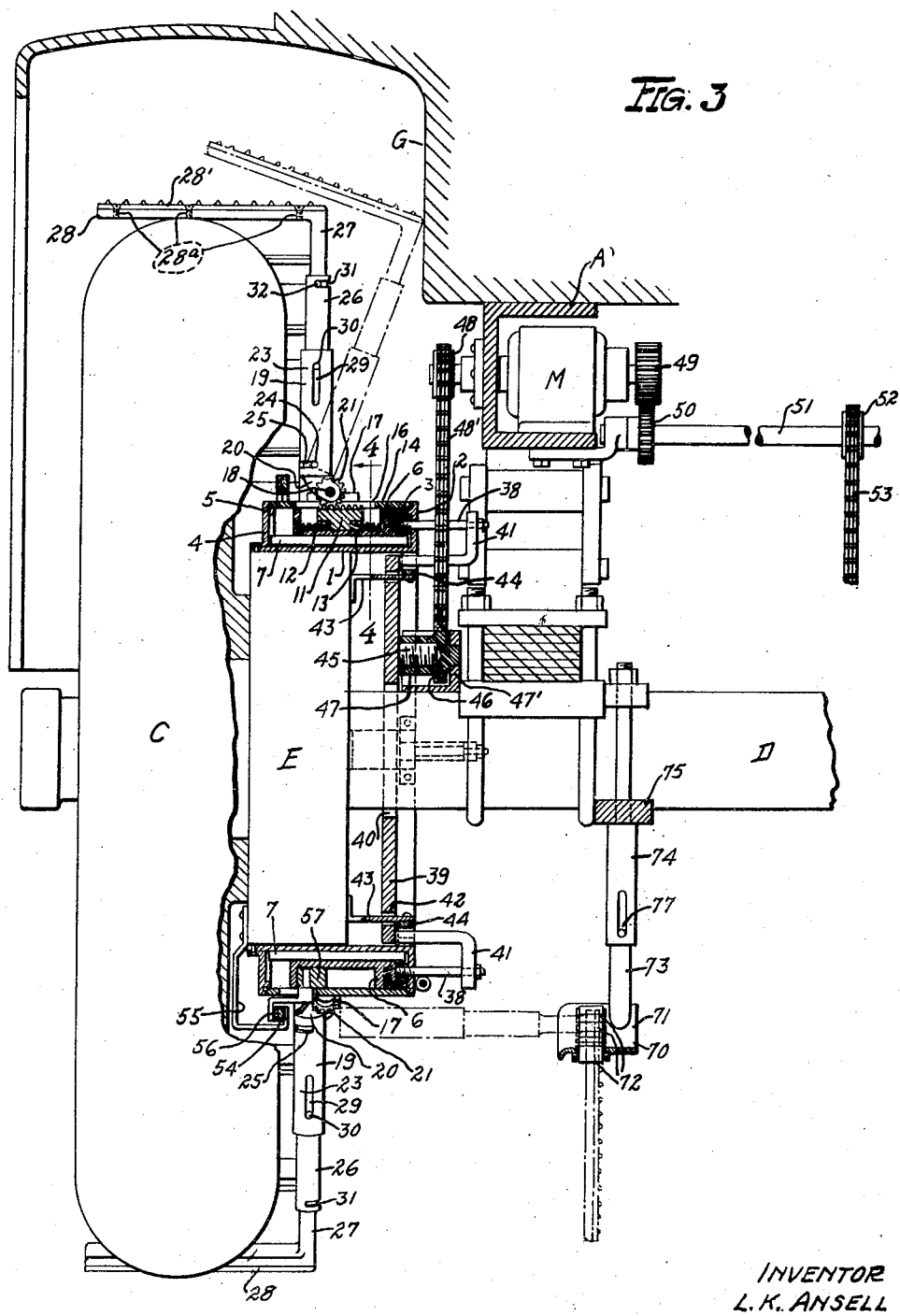

Jan 6, 1931.  L. K. ANSELL  1,787,608
ANTISKIDDING DEVICE FOR MOTOR VEHICLES
Filed Oct. 9, 1929   3 Sheets-Sheet 3
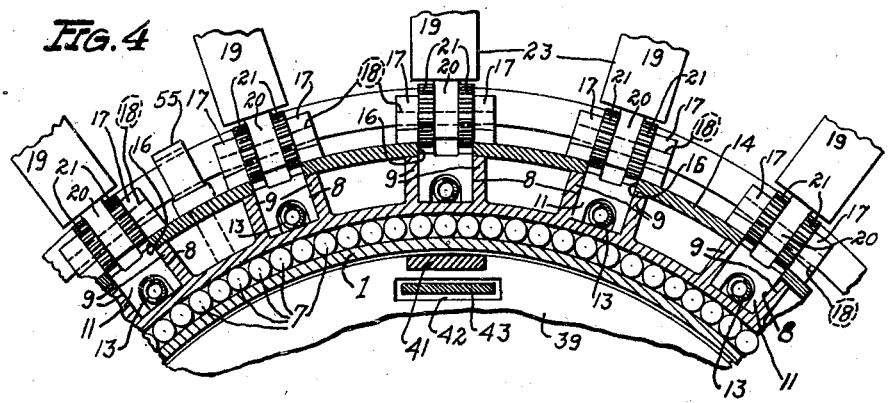
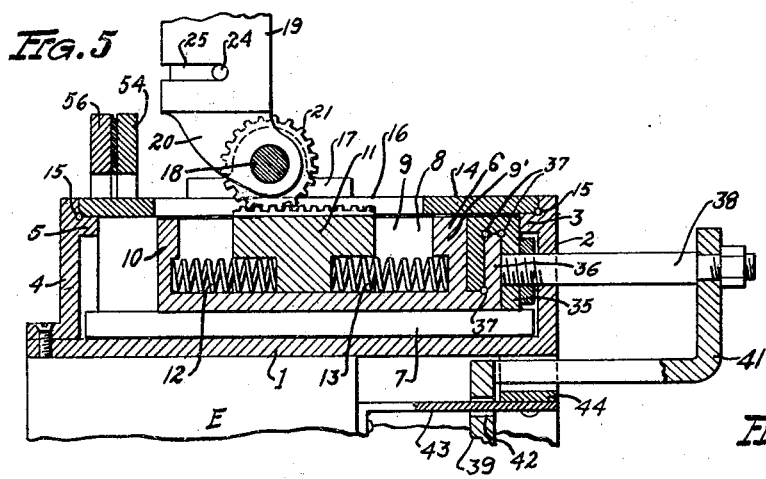
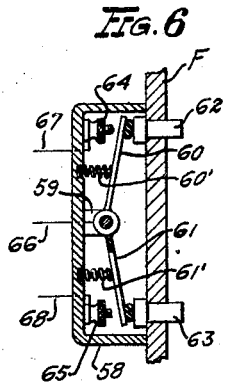
INVENTOR
L. K. ANSELL
BY J. G. Cook
ATTORNEY Patented Jan. 6, 1931

1,787,608

UNITED STATES PATENT OFFICE

LOUIS K. ANSELL, OF ST. LOUIS, MISSOURI

ANTISKIDDING DEVICE FOR MOTOR VEHICLES

Application filed October 9, 1929. Serial No. 398,420.

This invention relates generally to antiskidding devices for vehicles, and particularly to devices of this type which may be moved into and out of operative position at the wheels of vehicles by the operators of said vehicles, without said operators leaving their seats at the controlling mechanism of the vehicles, the predominant object of the invention being to provide a simple device of this type which will function with the maximum efficiency.

Fig. 3 is a vertical section on the approximate scale of Fig. 2 showing a rear wheel and rear axle of a vehicle equipped with my improved device.

Fig. 4 is an enlarged section on line 4—4 of Fig. 3.

Fig. 5 is an enlarged sectional detail illustrating the mechanism for actuating the ground contacting elements of my device.

Fig. 6 is a section of the switch for controlling the operation of the ground contacting elements of the device.

Figure 1:
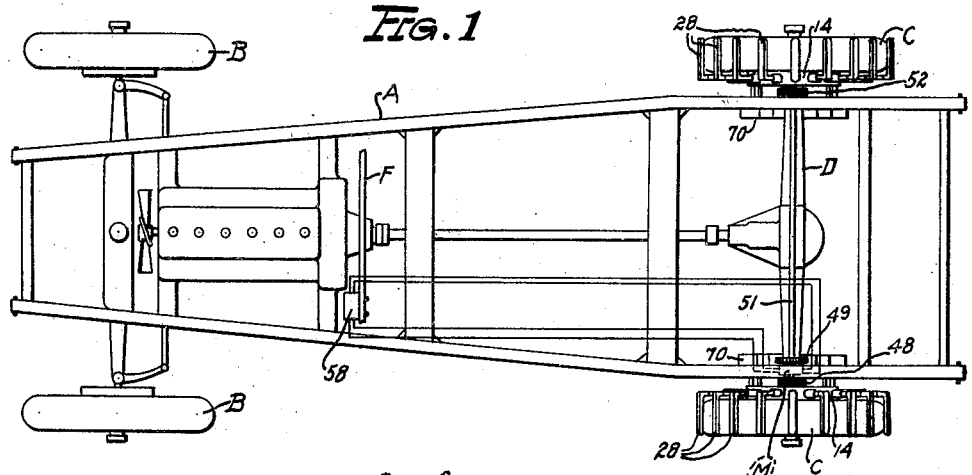
Fig. 1 is a plan view of the chassis of a motor vehicle equipped with my improved device.

In the drawings, wherein is shown for the purpose of illustration, merely, one embodiment of the invention, and referring particularly to Fig. 1 of said drawings, A designates the chassis of a motor vehicle, which is provided with the usual front wheels B, rear wheels C, and rear axle D on which the rear wheels C are supported. Each of the rear wheels C has associated with it the usual braking mechanism comprising a brake housing E, non-rotatably fixed to the rear axle D, and a brake drum (not shown) which is rotatable with the associated rear wheel and is disposed for such rotary movement within the brake housing E.

Fixed to each of the brake housings E at the rear wheels of the chassis A shown in Fig. 1, is an annular retaining member 1 which, as shown most clearly in Figs. 3 and 5, is provided with an outwardly extended flange portion 2, said flange portion having an inwardly extended, annular supporting flange 3 formed thereon, as shown in the views referred to. At the side of the annular member 1 opposite to the side thereof at which the flange portion 2 is located I provide a flange portion 4, which is similar to the flange portion 2 and is provided with an inwardly extended annular, supporting flange 5 resembling the supporting flange 3 already referred to. The flange portion 4 is removably attached to the annular member 1, being secured thereto by suitable fastening devices, and the supporting flange 5 thereof is alined horizontally with the supporting flange 3 of the flange portion 2.

Disposed between the flange portions 2 and 4 of the annular member 1 is a carrier 6 (Figs. 4 and 5), said carrier being capable of rotary movement with respect to said member 1, and anti-friction rollers 7 are interposed between the carrier 6 and the member 1 so as to facilitate this rotary movement. Spaced circumferentially of the carrier 6 is a plurality of guideways 8 (Figs. 4 and 5), each of which comprises spaced apart side walls 9, and end walls which are provided by annular upstanding flanges 9' and 10 arranged respectively at opposite sides of the carrier 6 (Fig. 5). Located within each of the guideways 8 and adapted for longitudinal sliding movement with respect to the side walls thereof is a rack 11. The rack 11 arranged in each guideway 8 contacts with the side walls of the guideway and is guided thereby, and 12 and 13 designate coil springs which are located at opposite ends of the rack, the coil spring 12 being interposed between the rack and the upstanding flange 10 of the carrier 6, and the coil spring 13 being interposed between said rack and the upstanding flange 9' of the carrier.

14 designates an annular plate which is supported by the inwardly extended flanges 3 and 5 on the flange portions 2 and 4, respectively. The annular plate 14 is capable of rotary movement with respect to flanges 3 and 5, anti-friction balls 15 being employed to facilitate this movement (Fig. 5). At the location of each of the guideways 8 the annular plate 14 is provided with an aperture 16, and fixed to said annular plate at opposite sides of each of said apertures is a pair of supporting bearings 17 (Fig. 4). Supported in each pair of the bearings 17 is a short shaft 18, and fixed to each of said shafts 18 is a ground contacting element 19. Each ground contacting element 19 at the end thereof which is connected to the associated shaft 18 has a reduced portion 20 of less thickness than the distance between the pair of associated bearings 17, and the reduced portions 20 are disposed between the bearings 17 so there are spaces at the opposite sides of said reduced portions. Fixed to each of the shafts 18 in the spaces at the opposite sides of the reduced portion 20 is a pair of pinions 21, said pinions being arranged in mesh with the teeth of an associated rack 11, and each of said racks having a pair of rows of teeth with which the spaced apart pinions mesh as shown in Fig. 4.

Figure 2:
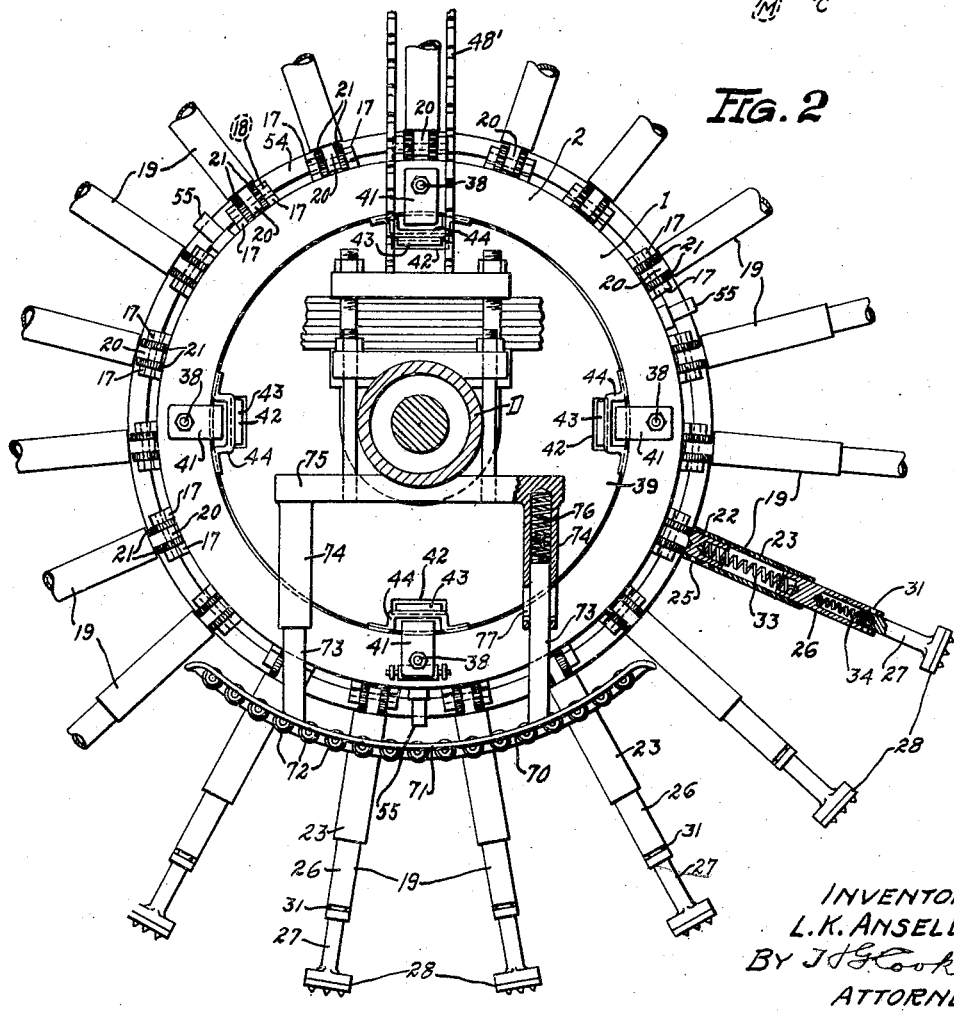
Fig. 2 is an enlarged fragmentary section taken through the rear axle of the vehicle illustrated in Fig. 1 and looking in the direction of one of the rear wheels of said vehicle.

By referring to Fig. 2, it will be noted that one of the ground contacting elements 19 is shown in section, and an examination of this element reveals that each ground contacting element includes an inner member 22 of which the reduced portion 20 forms a part. 23 designates a tubular element which surrounds the member 22 and extends outwardly therefrom, said member 22 being provided with a pin 24 which extends through a slot 25 in the tubular element, whereby the tubular element is connected to the member 22 in a manner to permit of slight rotary movement of the tubular element with respect to the member 22. 26 designates a member which telescopes within the outer end of each tubular element 23, said member 26 being hollow at its forward end and a member 27 being telescoped thereinto. The member 27 is provided with an offset ground contacting portion 28 which, as shown clearly in Fig. 3 of the drawings, is movable to a position where it is arranged adjacent to the peripheral face of the tire of the associated rear wheel C of the vehicle A. Each tubular element 23 at its outer end is provided with a slot 29 which extends longitudinally thereof, and each member 26 is provided with a pin 30 which extends through the slot 29 of the associated tubular element, whereby said parts are connected together in a manner to permit longitudinal movement of the member 26 with respect to the tubular element. Also, each member 26 at its forward end is provided with a slot 31 into which a pin 32, carried by the associated member 27, extends, said slot being extended transversely to the axis of said member 26. Interposed between each member 22 and the associated member 26 is an expansible and contractile coil spring 33, and interposed between portions of the member 26 and the member 27 is a torsional coil spring 34, the opposite ends of which torsional coil spring are connected to said members 26 and 27, as shown in Fig. 2.

35 designates an annular element (Fig. 5) which is provided with an annular recess into which annular flanges 36 on the various carriers 6 extend. During operation of the device the carriers rotate with respect to the annular element 35, and to facilitate this movement I employ anti-friction balls 37. Attached to the annular element 35 and extended outwardly therefrom is a plurality of rods 38, there preferably being four of said rods as shown in Fig. 2. 39 designates a plate (Fig. 3) which is provided with a centrally disposed opening 40 through which the rear axle D of the vehicle A extends. One of these plates is located adjacent to each rear wheel C of the vehicle, and each plate 39 has L-shaped brackets 41 attached thereto to which the rods 38 are fixed. Each of the plates 39 is provided with apertures 42 through which supporting brackets 43 extend. The brackets 43 are fixed to the non-rotatable brake housing E, and at their outer ends said brackets are secured to substantially U-shaped elements 44 (Fig. 2), which are attached to the annular retaining element 1. The brackets 43 and U-shaped elements 44 serve to rigidly fix the annular retaining element 1 to the brake housing E.

Extended outwardly from each plate 39 is a screw-threaded stem 45, said stem being rigidly fixed to said plate as shown in Fig. 3. 46 designates a sprocket wheel provided with an elongated hub portion 47, said hub portion having a screw-threaded recess formed therein into which the screw-threaded stem 45 extends. The sprocket wheel 46 is supported for rotary motion by a bracket 47' fixed to and supported by the rear axle housing D of the vehicle. Supported by the chassis of the vehicle is an electric motor M, said motor having a sprocket wheel 48 fixed to the drive shaft thereof, and a sprocket chain 48' operates over said sprocket wheel 48 and over the sprocket wheel 46 already referred to. The drive shaft of the motor M at the end thereof opposite to the end at which the sprocket wheel 48 is mounted (Fig. 3) has fixed thereto a pinion 49, and this pinion meshes with a second pinion 50 mounted on a shaft 51 on which a sprocket wheel 52 is fixed. 53 designates a sprocket chain which operates over said sprocket wheel 52, and said sprocket chain operates also over a sprocket wheel (corresponding to the sprocket wheel 46) located at the rear wheel C opposite to that illustrated in Fig. 3. The mechanism illustrated in Fig. 3 is duplicated at the opposite rear wheel, hence the single motor M actuates both sets of mechanism.

54 designates a clutch element (Fig. 3) which is secured to the rotatable brake drum by brackets 55, and 56 designates a clutch element which is connected to a block 57 fixed to the carrier 6. As will presently appear herein, the clutch element 56 is movable into and out of engagement with the clutch element 54 in response to transverse movement of the carrier 6 with respect to the annular retaining element 1.

Mounted on the instrument board F of the vehicle A (Fig. 1) is an electric switch 58 which is constructed as illustrated in Fig. 6. The switch 58 includes a central supporting member to which independently operable elements 60 and 61 are pivotally attached. The switch elements 60 and 61 are urged forwardly by coil springs 60' and 61', respectively, and said switch elements have push buttons 62 and 63 associated therewith whereby said switch elements may be moved rearwardly against the action of the coil springs into contact with the binding posts 64 and 65, so as to make electrical contact between the conductor 66 (Fig. 6), leading to the hinge point of said switch elements, and the conductors 67 and 68 leading to the binding posts 64 and 65 respectively. The motor M is so wired as to be capable of actuation in opposite directions, and the switch element 60, when moved into contact with the binding post 64, will cause said motor to be operated in one direction while movement of the switch element 61 into contact with the binding post 65 will cause the motor M to be operated in the opposite direction.

When, in the operation of a motor vehicle equipped with my improved device, the ground contacting members 19 are not in use, said members are withdrawn from the positions in which they are shown by full lines in Fig. 3 to the positions in which said members are illustrated by dotted lines in said view. Assuming that the ground contacting members 19 are in their retracted positions as illustrated by dotted lines in Fig. 3, and it is desired to move them to their operative positions, the push button 62 of the switch 58 will be pressed inwardly to cause the switch element to make contact with the binding post 64, whereby an electrical circuit leading to the motor will be completed and said motor will be caused to operate, with the result that the sprocket wheels 48 and 52 will be rotated. The rotary movement of the sprocket wheels 48 and 52 will be transmitted by the sprocket chains 48' and 53 to the sprocket wheels associated with the screw-threaded stems 45 of the plates 39 at the opposite rear wheels C of the vehicle. Rotation of the last mentioned sprocket wheels will cause the screw-threaded stems 45 and the plate 39 to be moved inwardly, and as the rods 38 associated with the carriers 6 are connected to the plates 39 by the brackets 41, said carriers will likewise be moved inwardly. The racks 11 are movable with the carriers 6, hence the inward movement of the carriers through the instrumentality of said racks will cause the pinions 21 to be rotated, and because said pinions are fixed to the shafts 18 to which the ground contacting elements are fixed, the outer ends of said ground contacting elements will be swung in an arc of a circle about the shafts 18, so as to move the portions 28 of the ground contacting elements 19 to positions adjacent to the periphery of the rear ground wheels C, as illustrated by full lines in Fig. 3.

When the ground contacting elements 19 are in their inoperative positions, all of the mechanisms associated with the rear wheels C, with the exception of the clutch elements 54, are maintained in a stationary or non-rotatable condition. However, when the carriers 6 are moved inwardly as described, the clutch element 56 will be moved into contact with the clutch elements 54 which rotate with the rotatable brake drums, and this contact between said clutch elements will cause the carriers 6 (together with the racks and other parts associated therewith), the annular plate 14, and all of the ground contacting elements 19 to rotate with the brake drums of the vehicle, and therefore the respective rear wheels C and the ground contacting elements associated therewith will rotate as units.

The coil springs 12 and 13 associated with the racks 11 (Fig. 5) are of such strength that under ordinary conditions they provide unyielding connections between the racks and the carrier 6. However, if during transverse movement of the carriers any of the ground contacting elements are prevented from moving, the carriers may continue to move while the ground contacting elements and racks are held fast, the coil springs at one or the opposite side of the racks yielding to permit such movement of the carriers. This is apparent in connection with the ground contacting elements at the upper portion of the rear wheels C, as when the ground contacting elements at the upper portions of the wheels C are retracted they are stopped by portions of the fenders G of the vehicle before they reach their completely retracted positions. This, however, as already stated, does not prevent the carriers 6 from completing their entire movements.

As already stated, the motor M is wired so that it is operable in opposite directions, and when it is desired to move the ground contacting elements from their operative positions, as shown by full lines in Fig. 3, to the inoperative or dotted line positions of said ground contacting elements in said view, the push button 63 of the switch 58 is depressed, whereby an electric circuit is completed which includes the conductors 66 and 68 (Fig. 6). This circuit causes the motor M to be actuated in the opposite direction to that in which it is actuated when the push button 62 is depressed, whereby the carriers 6 will be moved outwardly and the racks 11 will rotate the pinions 21 in a direction to move the outer ends of the ground contacting elements inwardly with respect to the rear wheels C.

When the ground contacting elements 19 are moved inwardly with respect to the rear wheels C, the ground contacting elements at the upper portions of the rear wheels contact with the fenders G, as already described, and are thus arrested in their movement. The remainder of the ground contacting elements, however, move to the dotted line position of the ground contacting element 19 at the lower portion of Fig. 3; that is to say, the shank portions of said elements are disposed in a substantially horizontal position, and the ground contacting portions 28 of said elements 19 are extended radially with respect to the wheels C. With the elements 19 so positioned, it is apparent that the ground contacting portions 28 thereof at the lower portions of the wheels C may strike obstacles in the road over which the vehicle is traveling, and I therefore employ the deflector 70 illustrated in Figs. 2 and 3. This deflector comprises an arcuate plate 71, which supports a plurality of anti-friction rollers 72. The plate 71 is provided with upwardly extended rods 73 which are telescoped into tubular elements 74, said tubular elements forming parts of a bracket 75 which is secured by suitable means to the rear axle housing D of the vehicle A. 76 designates coil springs, which are arranged within the tubular elements 74 and tend to force the rods 73 outwardly with respect to said tubular elements. The rods 73 and tubular elements are connected together by slot and pin connections, as illustrated at 77 in Fig. 2.

When the push button 63 is depressed to move the ground contacting elements 19 to retracted positions, the portions 28 of at least two of said elements 19 associated with a wheel C will be confined between the associated wheel and the ground, and this will prevent rearward movement of said ground contacting elements with respect to the wheel. This, however, will not prevent the carriers 6 from being moved, as certain of the coil springs associated with the racks will yield and permit movement of the carriers while the restrained ground contacting elements are held fast, and as soon as the restrained ground contacting elements are released the compressed springs will move them to their retracted positions. After the disengagement of the clutch elements 54 and 56, there will be some rotation of the ground contacting elements, and as the radially extended portions 28 of said retracted elements contact with the deflector and said elements continue to rotate with respect to said deflector, the portions 28 will be dragged along the rollers 72 supported by the arcuate plate 71, whereby the members 27 will be rotated axially with respect to the members 26 with which they telescope, and the portions 28 of said members 27 will be turned so as to be substantially parallel with the ground. This has the effect of winding up the torsional coil springs 34 associated with the ground contacting elements in contact with the deflector, and when said ground contacting elements pass out of contact with the deflector, said torsional coil springs will return the portions 28 of the ground contacting elements to their original radial positions. It is apparent, therefore, that the portions 28 of the ground contacting portions located at the lower portions of the wheels C are turned so that they are remote from the ground, whereby likelihood that said portions will be struck by obstacles in the road is very greatly reduced. It is also plain that the telescoping arrangement of the ground contacting elements 19, together with the coil springs 23, permit said elements to yield with the tires of the vehicle wheels as they contact with the ground.

The offset ground contacting portions 28 of the elements 19 have plates 28' removably fixed thereto by means of suitable fastening devices 28ᵃ, whereby said plates may be removed for replacement when desired. Also, the plates 28' are provided with sharpened, case hardened projections arranged thereon, which will bite into the ground.

It is obvious that instead of utilizing a motor for moving the elements 19 to operative and inoperative positions, I may employ a simple mechanical arrangement which will permit of said operations being performed mechanically by manipulation of a simple crank at the position of the operator of the vehicle.

I claim:

1. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including toothed elements arranged for rotary movement with the vehicle wheel and movement parallel with the axis thereof, and toothed elements associated with said pivoted ground contacting elements with which the first mentioned toothed elements mesh.

2. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including racks arranged for rotary movement with the vehicle wheel and movement parallel with the axis thereof, and pinions arranged at the pivotal points of said ground contacting elements with which said racks mesh.

3. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including racks arranged for rotary movement with the vehicle wheel and movement parallel with the axis thereof, pinions arranged at the pivotal points of said ground contacting elements with which said racks mesh, and a carrier for supporting said racks.

4. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including racks arranged for rotary movement with the vehicle wheel and movement parallel with the axis thereof, pinions arranged at the pivotal points of said ground contacting elements with which said racks mesh, a carrier for supporting said racks, and means for imparting movement to said carrier in a direction parallel with the axis of the vehicle wheel.

5. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including racks arranged for rotary movement with the vehicle wheel and movement parallel with the axis thereof, pinions arranged at the pivotal points of said ground contacting elements with which said racks mesh, a carrier for supporting said racks, and means for imparting movement to said carrier in a direction parallel with the axis of the vehicle wheel, said means including a non-rotatable plate connected to said carrier in a manner to permit rotary movement of said carrier with respect to said plate.

6. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including racks arranged for rotary movement with the vehicle wheel and movement parallel with the axis thereof, pinions arranged at the pivoted points of said ground contacting elements with which said racks mesh, a rotatably supported carrier for supporting said racks, means for imparting movement to said carrier in a direction parallel with the axis of said vehicle wheel, said means including a non-rotatable element connected to said carrier in a manner to permit rotary movement of said carrier with respect to said non-rotatable element, a screw-threaded member associated with said non-rotatable element, and a rotatable screw-threaded element arranged to impart movement to said screw-threaded member in a direction parallel with its axis.

7. An anti-skidding device for a vehicle wheel comprising a plurality of pivotally supported ground contacting elements movable from retracted positions to positions adjacent to the periphery of a vehicle wheel, and means for subjecting said ground contacting elements to such movement, said means including racks arranged for rotary movement with the vehicle wheel and movement parallel with the axis thereof, pinions arranged at the pivoted points of said ground contacting elements with which said racks mesh, a rotatably supported carrier for supporting said racks, yieldable connections between said racks and said carrier, means for imparting movement to said carrier in a direction parallel with the axis of said vehicle wheel, said means including a non-rotatable element connected to said carrier in a manner to permit rotary movement of said carrier with respect to said non-rotatable element, a screw-threaded member associated with said non-rotatable element, and a rotatable screw-threaded element arranged to impart movement to said screw-threaded member in a direction parallel with its axis.

8. An anti-skidding device for a vehicle wheel comprising a plurality of pivotally supported ground contacting elements movable from retracted positions to positions adjacent to the periphery of a vehicle wheel, a rotatable element with which said ground contacting elements are associated, a clutch element fixed to said rotatable element, a clutch element movable with said vehicle wheel, and means for moving one of said clutch elements into engagement with the other to cause said rotatable element to rotate with the vehicle wheel.

9. An anti-skidding device for a vehicle wheel comprising a plurality of pivotally supported ground contacting elements movable from retracted positions to positions adjacent to the periphery of a vehicle wheel, each of said ground contacting elements comprising a pair of telescoping members yieldingly connected together for longitudinal movement with respect to each other, and an element telescoping with one of said telescoping members and arranged for rotary movement with respect thereto, a torsional coil spring associated with said element, and means for subjecting said ground contacting elements to movement into and out of operative positions.

10. An anti-skidding device for a vehicle wheel comprising a plurality of pivotally supported ground contacting elements movable from retracted positions to positions adjacent to the periphery of a vehicle wheel, each of said ground contacting elements comprising a pair of telescoping members yieldingly connected together for longitudinal movement with respect to each other, and an element telescoping with one of said telescoping members and arranged for rotary movement with respect thereto, a torsional coil spring associated with said element, a deflector for imparting movement to said element, and means for subjecting said ground contacting elements to movement into and out of operative positions.

In testimony that I claim the foregoing I hereunto affix my signature.

LOUIS K. ANSELL.